H. E. EVANS.
Hay-Loader.
No. 203,254.  Patented May 7, 1878.
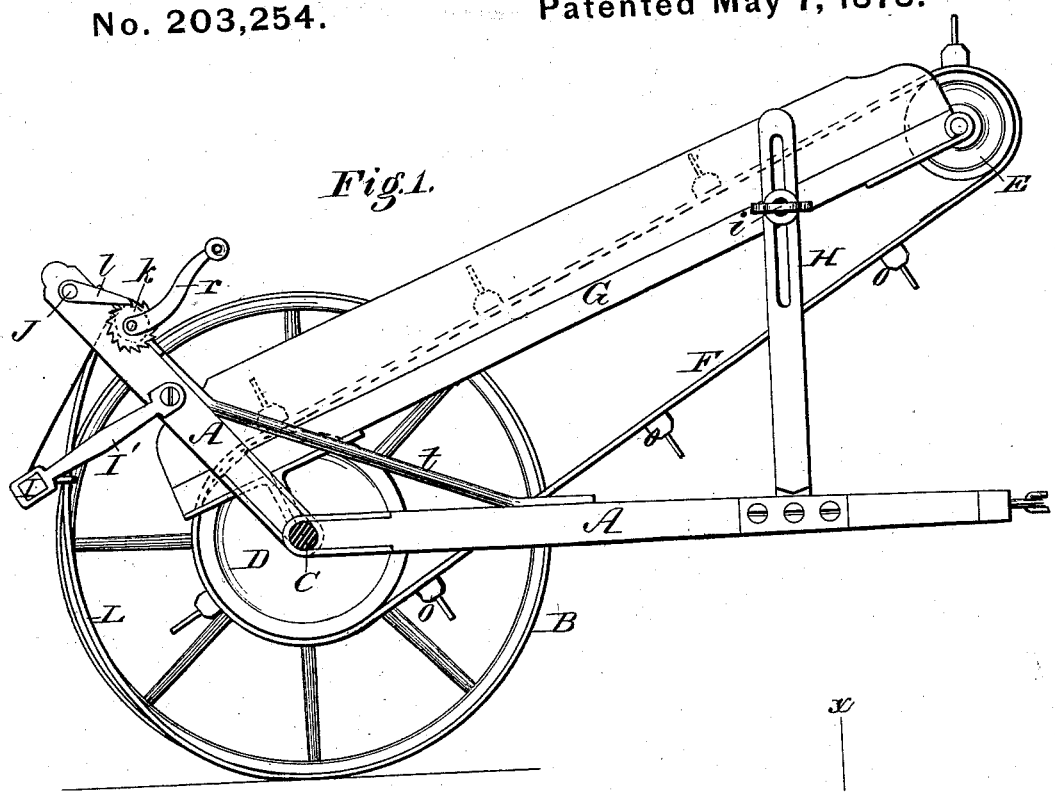
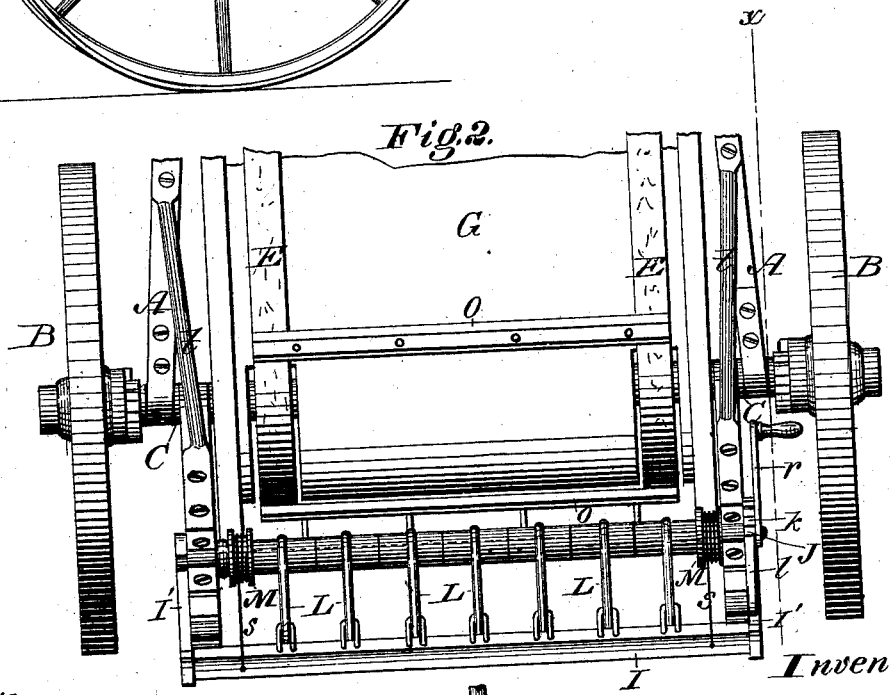
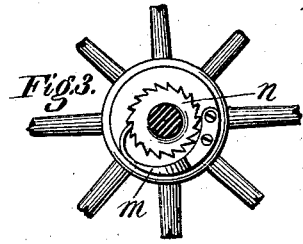
Witnesses:
Will W. Dodge.
Donn P. Twitchell.
Inventor:
H. E. Evans.
by his attys.
Dodge & Son

UNITED STATES PATENT OFFICE.

HERBERT E. EVANS, OF FLINT, MICHIGAN.

IMPROVEMENT IN HAY-LOADERS.

Specification forming part of Letters Patent No. 203,254, dated May 7, 1878; application filed October 13, 1877.

*To all whom it may concern:*

Be it known that I, HERBERT E. EVANS, of Flint, in the county of Genesee and State of Michigan, have invented certain Improvements in Hay-Loaders, of which the following is a specification:

My invention relates to that class of machines for collecting and loading hay upon wagons in the field which consist, essentially, of a truck to be attached to and drawn by the wagon, and provided with a rake to gather the hay and a conveyer to receive the hay from the rake and elevate or convey the same to a point above the wagon, whence it falls upon the same; and the improvements consist in certain details of construction, as hereinafter more fully explained.

In the accompanying drawings, Figure 1 represents a side elevation of my improved apparatus; Fig. 2, a plan view of a portion of the same; and Fig. 3, a section on the line $x\,x$ of Fig. 2, showing the clutch by which the wheels are caused to rotate the axle and operate the machine.

In carrying out my invention, I construct a strong frame, A, supported at its rear end upon a transverse axle, C, mounted in traction-wheels B, and at its forward end to be attached to and sustained by the rear end of the wagon on which the hay is to be loaded. The axle C is journaled and free to turn in the frame A, and the wheels B are free to turn on the axle C, except when locked therewith by a clutch, as hereinafter explained.

Upon the axle C is also supported, in a similar manner, the rear end of an inclined platform, G, the forward end of which is raised and held at any desired elevation by means of clamping-screws $i$, passing through slotted uprights or standards H, pivoted at their lower ends to the frame A.

As represented in Figs. 1 and 2, the main frame A consists of two portions, the forward section occupying, when in use, a horizontal or nearly horizontal position forward of the axle C, to which both sections are journaled, while the rear section is inclined upward in rear of said axle, and firmly and rigidly connected with the forward section by braces $t$, as shown. The rear portion of the frame is furnished at its upper end with a transverse shaft, J, upon which are loosely hung the rake-teeth L, said teeth passing through eyes or staples in a guide-bar, I, hung to the frame A below the shaft J, and parallel therewith. The shaft J is journaled in the frame A, as shown in Fig. 2, and is provided near its ends with short drums M, from which cords or chains $s$ extend to the ends of the guide-bar I, and at one end, outside of the frame A, with a crank, $r$, by which to rotate the shaft J, and a ratchet $k$, with which engages a pawl, $l$, to prevent the shaft from turning backward. The guide-bar I is hung to the frame A by means of arms I' pivoted to the frame, as shown in Fig. 1. By this arrangement it will be seen that as the shaft J is rotated the guide-bar I is elevated, and its staples, bearing against the teeth L, throw them backward and upward clear of the ground, in which position they are held by the pawl $l$ and ratchet $k$.

The rear end of the platform G is raised somewhat above the axle C, as shown in Fig. 1, and upon the axle are secured two wheels or pulleys, D, the upper sides of which are arranged to come flush with or slightly above the upper face of the platform G, as shown; and at the upper end of the platform is arranged a similar pair of pulleys, E, the pulleys being arranged in each case near the edges of the platform. From the pulley D to the pulley E, at each side and around the same, extend endless belts F, provided at intervals with transverse toothed bars or slats O, as shown in Figs. 1 and 2.

The wheels B are each provided on the inner end of the hub with a spring-pawl, $m$, arranged to engage with a ratchet, $n$, formed upon or secured to the axle C, in such manner that as the machine moves forward the wheels B shall cause the axle to rotate and operate the conveyer, but that the axle shall not be rotated by a backward motion of the machine.

By simply disengaging the pawl $l$ from the ratchet $k$, the rake is allowed to fall down to its operating position, its fall being controlled by the crank $r$.

Having thus described my invention, what I claim is—

The loose rake-teeth and their adjusting-drums, both mounted on the same shaft, in combination with intermediate connecting devices, substantially such as shown.

HERBERT E. EVANS.

Witnesses:
 ALBERT W. GILLIERT,
 SAMUEL D. BENTLEY.